J. R. FORDYCE.
COTTON BALE CARRIER.
APPLICATION FILED NOV. 14, 1913.
1,132,003.
Patented Mar. 16, 1915.
2 SHEETS—SHEET 1.
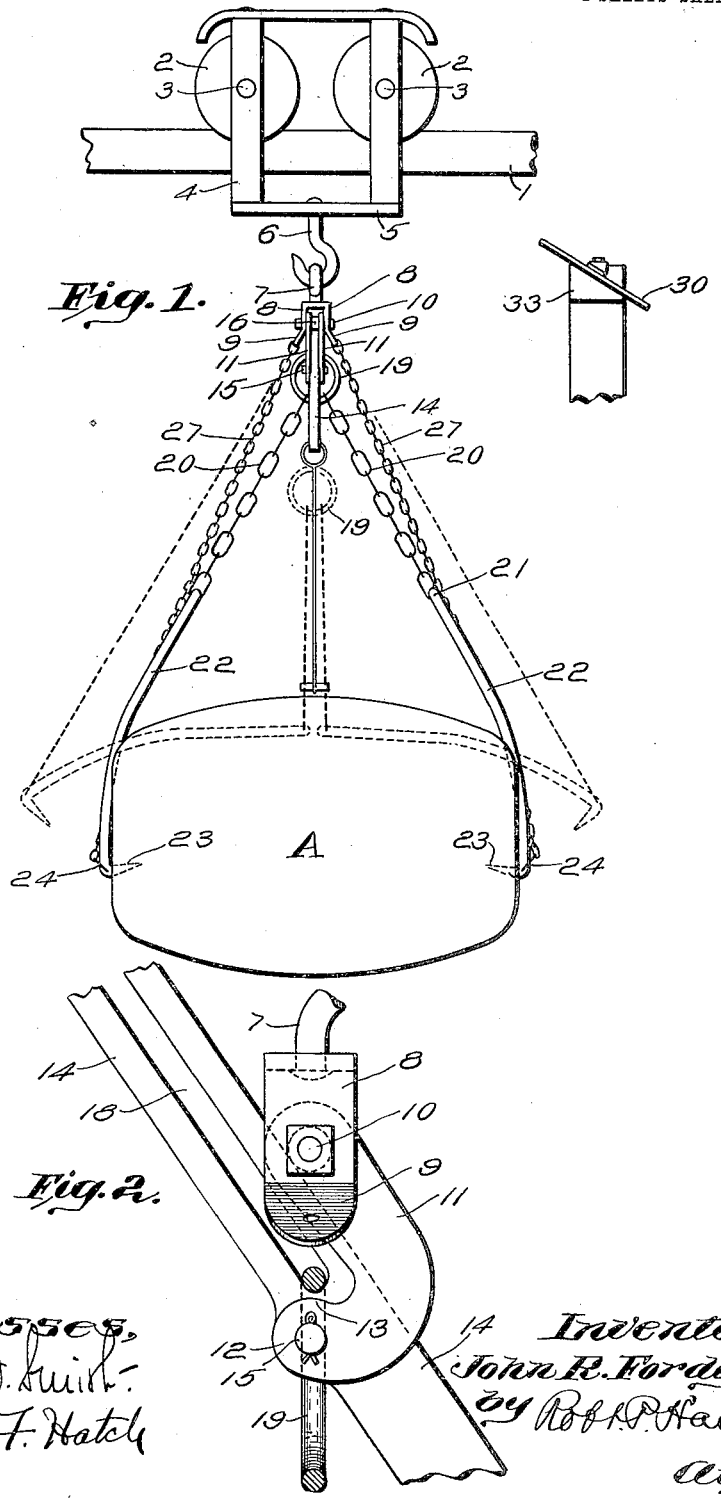

J. R. FORDYCE.
COTTON BALE CARRIER.
APPLICATION FILED NOV. 14, 1913.

1,132,003.

Patented Mar. 16, 1915.
2 SHEETS—SHEET 2.

Witnesses,
Beatrice J. Smith
Rowell F. Hatch

Inventor,
John R. Fordyce,
by Rob't T. Harris.
atty.

UNITED STATES PATENT OFFICE.

JOHN R. FORDYCE, OF LITTLE ROCK, ARKANSAS.

COTTON-BALE CARRIER.

1,132,003.   Specification of Letters Patent.   Patented Mar. 16, 1915.

Application filed November 14, 1913. Serial No. 800,906.

*To all whom it may concern:*

Be it known that I, JOHN R. FORDYCE, a citizen of the United States, and resident of Little Rock, county of Pulaski, and State of Arkansas, have invented an Improvement in Cotton-Bale Carriers, of which the following description, in connection with the accompanying drawings, is a specification, like letters on the drawings representing like parts.

The invention to be hereinafter described relates to cotton bale carriers of that general type wherein the carriers are associated with a trolley or traveling device for transferring cotton bales from one point to another. In devices of this general character it is desirable that the heavy and bulky bales of cotton or similar material be readily connected to and the weight thereof be conveniently assumed by the carrier with the minimum expenditure of manual effort, and that upon reaching the point of delivery, the load be readily dropped or released from the carrier. With these facts in mind the aims and purposes of the present invention will best be made clear from the following description and accompanying drawings of one form of means for carrying the invention into practical effect, it being understood that the details of the means hereinafter described may be varied or modified within the true scope of the actual invention which is definitely set forth by the claims.

Figure 3:
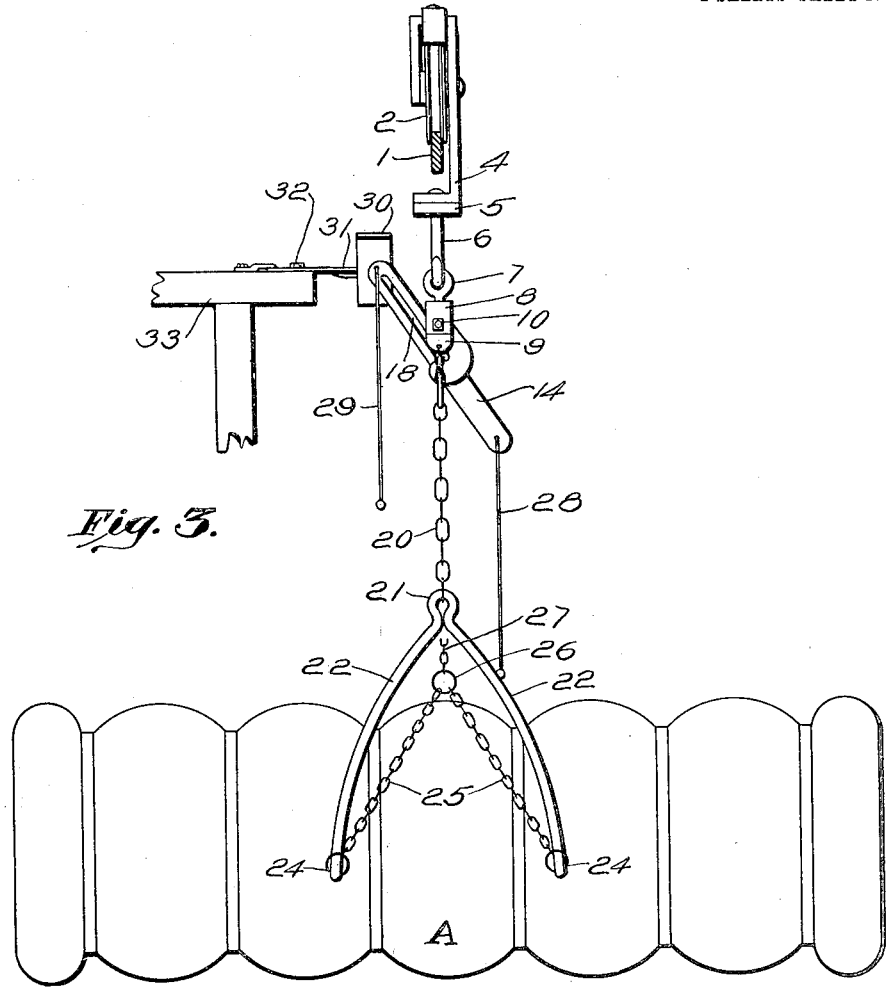
Figure 4:
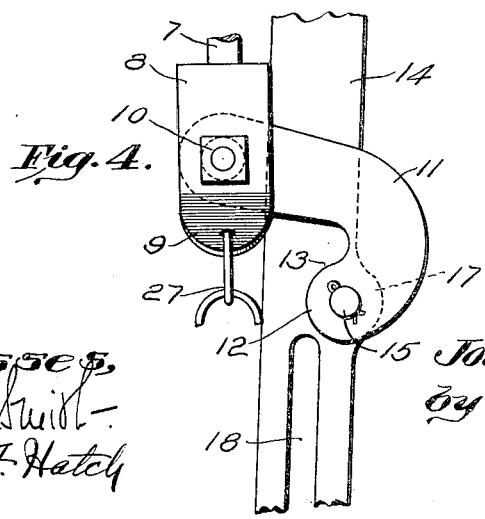

In the drawings: Figure 1 is an end view of a bale of cotton or like material suspended from a trolley by means of the present invention, the dropping position of the hooks being indicated by dotted lines; Fig. 2 is an enlarged detail showing parts of the dropping mechanism in bale-carrying position, some of the parts being broken away; Fig. 3 is a side view of the parts of Fig. 1, showing the bale in side elevation supported by the carrier; and Fig. 4 is an enlarged detail similar to that of Fig. 3, but showing the parts of the dropping mechanism in another position.

The trolley may be of any usual or desired character and sustained in operative position by the usual means well understood in the art, and as indicated in the drawing comprises the stationary track 1 on which ride the rollers 2 pivoted at 3 in an appropriate frame 4, the lower portion 5 of which is provided with a swiveled hook 6.

Suspended from the swiveled hook 6 of the trolley is a hook or ring 7 suitably swiveled in a clevis, the clevis being of any desired construction and preferably comprising the side arms 8 having the flaring end portions 9 and carrying a pivot stud 10. Upon the stud 10 of the clevis and between the side arms 8 thereof are pivotally supported the angular arms 11, which for identification, may hereinafter be known as the tilting angular arms. These tilting angular arms 11 are preferably of the general form best shown by Figs. 2 and 4, wherein it will be noted that the end portion 12 of the tilting angular arms has somewhat flattened shouldered portions 13. The particular form of these angular arms may of course be modified, but the character thereof as indicated in the drawings, has been found a convenient and good practical form of this feature of the invention. Between the tilting angular arms 11 is the drop lever 14, said drop lever 14 being pivotally connected intermediate its ends to the tilting angular arms 11 at 15, see Figs. 2 and 4, the construction being such that the drop lever 14 may be readily turned upon its pivotal connection 15 with the tilting angular arms 11. It will be noted that the drop lever 14 is pivoted on the pin or bolt 15 between the tilting angular arms so that all binding action of the lever is obviated. In order to properly separate the tilting angular arms 11 corresponding to their separation by the drop lever 14, a washer 16, Fig. 1, may be interposed between the upper ends of the tilting angular arms on the stud 10.

As hereinbefore noted, the drop lever 14 is connected to the tilting angular arms at a point intermediate its ends, and for this purpose it is conveniently provided with a projecting portion 17 through which the bolt or pin 15 passes. The drop lever 14 is provided with an elongated slot 18 at one side of its pivotal connection with the tilting angular arms, as indicated by Figs. 2, 3 and 4, and riding in this elongated slot 18 of the drop lever is the ring 19 to which the bale-sustaining hooks are connected by suitable means, such, for instance, as the chains 20, Figs. 1 and 3, said chains being engaged with the ring 19 at the upper ends and having their lower ends connected at 21 with the hooks 22.

The hooks 22 are preferably formed as indicated in Figs. 1 and 3, that is, they are formed in pairs, a pair of said hooks being joined to each of the chains 20 at 21. As a preferred construction of the hooks, each pair may be formed of a single piece bent as indicated in Fig. 3, and each leg thereof being provided at its lower end with the points 23. Obviously the details of the hook formation may be changed within the true scope of the invention, but the construction described has been found a good, practical, and convenient form of this feature of the invention. Each hook near its pointed ends 23 has connected thereto as at 24, a chain 25 which is joined to a ring 26, and connecting the ring 26 with the arm 9 of the clevis is a chain 27. It will be understood that each set or pair of hooks is provided with a similar connection with the clevis.

From the construction thus far described, it will be apparent that if the drop lever 14 is tilted into position as indicated by Figs. 2 and 3, the ring 19 connected to the pairs of hooks will be sustained in the lower end of the elongated slot 18 of said drop lever, or if the said slot 18 should be made somewhat longer than indicated in the drawings, said ring 19 would rest upon the flattened or shouldered portion 13 of the tilting angular arms. In either event, however, the ring 19 will rest either at the lower end of the slot 18 in the drop lever, or upon the shouldered portions of the tilting angular arms at a point slightly at one side of the vertical plane which passes through the axis 15 of the drop lever, the construction being such that with the parts in this position the ring 19 and its attached load will be held in stable equilibrium by the tilting angular arms. When the drop lever 14 is tilted in the reverse direction, substantially as indicated by Fig. 4, that is with the slot 18 extending downward from the tilting angular arms, the ring 19 will be moved to the opposite side of the vertical plane passing through the axis 15 of the drop lever, and on further tilting movement of the drop lever, will move to the lower end of the slot 18, as will be readily understood.

When the drop lever 14 is tilted in the manner last above described, the ring 19 descends, thereby slacking up the connections 20 between it and the hooks 22 on either side of the suspended bale A, Figs. 1 and 3. The chains 27, however, which are connected to the hooks near their pointed ends, are not slackened, as will be evident, so that as the ring 19 moves in the slot 18, the chains 27 will pull the pointed ends of the hooks from the bale, substantially as indicated by dotted lines in Fig. 1, thereby discharging the bale.

It will be noted that when the hooks 22 are connected to the bale, Fig. 1, the pointed ends 23 thereof extend not only into the bale, but upwardly therein, and when the chains 20 and ring 19 slacken their pull upon the hooks, the chains 27 will turn the hooks into the position substantially as indicated by the dotted lines in Fig. 1, wherein it will be noted that the pointed ends 23 of the hooks point downwardly, thus changing the direction of the ends of the pointed hooks and facilitating the discharge of the bale without injury thereto.

In order that the drop lever may be readily tilted, as hereinbefore described, it is provided at each end with a depending pull device 28 and 29, the former, 28, acting when pulled downwardly to tilt the drop lever into the position indicated by Figs 2 and 3, to thereby lift and sustain the bale and such pull 28 may therefore be known for identification, as the lift pull. The pull 29 is adapted to tilt the drop lever in the opposite direction to discharge or drop the bale as hereinbefore described, and may therefore be known for the purposes of identification as the drop pull. By the use of the lift and drop pulls, it will be readily seen that the bale may be grasped and lifted by the hooks 22, a pair at each side of the bale, and then the bale may be transported by the trolley to any desired point, whereupon a downward force exerted on the drop pull will act to discharge the bale in the manner stated.

It is sometimes desirable that the drop lever discharge the bales at a predetermined point and the present invention contemplates means acting automatically upon the drop lever to effect the discharge of the bale at the desired point. As one form of means to this end, and adjacent the point where the bale is to be dropped, there is provided a cam or inclined piece 30, Figs. 1 and 3, located in the path of the slotted end portion of the drop lever as the trolley moves the bale and its connected parts along the track 1. This cam or inclined piece 30 may be of any suitable character to effect the desired function of automatically discharging the bale, and as shown comprises the inclined piece 30 having an arm 31, Fig. 3, pivotally connected at 32 to a suitable support 33, whereby when the automatic action is desired, the piece 30 may be placed in operative position, as indicated by Fig. 3, and when such automatic action is not desired, the part 30 may be swung around its pivot point 32 out of the path of the drop lever.

While the bale-carrying hooks have been described as connected to the ring 19 and the clevis arms 9 by the chains 20 and 27 respectively, it is to be noted that other means than the chains might be employed, although it is desirable for the best results, that these connections be of a flexible nature.

In operation, the bales may be brought to a position under the trolley by trucks or other means, and the drop lever is then tilted with the slotted part down, substantially as indicated in Fig. 4, thereby lowering the hooks 22. The pointed ends 23 of the hooks are then fastened into the bale and the drop lever 14 is tilted into the reverse position, as indicated in Figs. 2 and 3, by pulling upon the lift pull 28. This causes the ring 19 to ride and seat itself as indicated in Fig. 2, within the tilting hooks, the bale at such times being suspended by the hooks and connected chains. If the bale has been taken to the desired position by the truck, the truck will then be removed and the bale be removed by the trolley to the point of discharge. When the bale is to dropped from its hooks, the drop lever 14 is tilted into dropping position, that is with the slot extending downward, such tilting action being caused either by a pull upon the drop pull or automatically by the inclined piece 30 hereinbefore described. Such tilting movement of the drop lever causes the ring 19 to pass to the lowest position in the slot 18 of said lever, thereby the connections 27 between the clevis and hooks exerts a withdrawing action of the hooks from the bale, substantially as indicated by dotted lines in Fig. 1, without injury to the bale.

It will be noted from the construction described, that when the hooks support the bale, the pull on the hooks through the connections 20 is substantially or nearly at right angles to the direction of the points 23 of the hooks, but when the drop mechanism is operated and the connections 20 slackened, the chains or flexible connections 27 act upon the hooks in a direction substantially or nearly parallel to the direction of the points 23 of the hooks, thereby withdrawing the points readily and without injury to the bale, as indicated by dotted lines.

Obviously changes may be made in the details of the construction without departing from the actual invention, which is pointed out by the claims.

What is claimed is:—

1. In a device of the character described, the combination of a track, a trolley movable thereon, angular arms suspended from said trolley and having shouldered portions, a drop lever pivoted to said angular arms beyond the shouldered portions and provided with a longitudinal slot, bale engaging hooks, means movable in the longitudinal slot of the drop lever for supporting said hooks, and means for tilting said drop lever to cause said first-named means to be moved into and out of the shouldered portion of the angular arms.

2. In a device of the character described, the combination of a trolley, angular arms pivotally suspended from the trolley and having shouldered portions, a drop lever pivoted to the free angular end portions of the angular arms and having a longitudinal slot, bale engaging hooks, flexible connections between the bale engaging hooks and the slotted portion of said lever, means for tilting said lever on the angular arms to carry the suspending portion of the hook connections into the shouldered portion of said angular arms and thus suspend the hooks and the load in stable equilibrium, and means for tilting the said lever in the opposite direction to carry said suspending portion beyond the shouldered portion of the angular arms to slacken the said suspending hook connections.

3. In a device of the character described, the combination of a trolley, angular arms pivotally suspended from the trolley and having shouldered portions, a drop lever pivoted to the free angular end portions of the angular arms and having a longitudinal slot, bale engaging hooks, flexible connections between the bale engaging hooks and the slotted portion of said lever, means for tilting said lever on the angular arms to carry the suspending portion of the hook connections into the shouldered portion of said angular arms and thus suspend the hooks and the load in stable equilibrium, means for tilting the said lever in the opposite direction to carry said suspending portion beyond the shouldered portion of the angular arms to slacken the said suspending hook connections, and means connected to the end portions of the bale engaging hooks to withdraw said hooks from the bale as said connections are slackened.

4. In a device of the character described, the combination of transporting means, bale engaging hooks, dropping mechanism comprising a longitudinally slotted arm pivotally connected to the transporting means at a point below the longitudinal slot in said arm, flexible connections between the slotted portion of said arm and bale engaging hooks, means for turning the slotted arm in one direction about its fulcrum below said slot to carry the suspending portion of said flexible connection to one side of the pivot of said arm, means to limit the movement of the arm in said direction, and means to tilt the said arm in the opposite direction to permit the suspending portion of the flexible connection to travel in said slot to the other side of the pivot of said arm.

5. In a device of the character described, the combination of transporting means, bale engaging hooks, dropping mechanism comprising a longitudinally slotted arm pivotally connected to the transporting means at a point below the longitudinal slot in said arm, flexible connections between the slotted portion of said arm and bale engaging hooks, means for turning the slotted arm in one direction about its fulcrum below said slot to carry the suspending portion of said flexible connection to one side of the pivot of said arm, means to limit the movement of the arm in said direction, means to tilt the said arm in the opposite direction to permit the suspending portion of the flexible connection to travel in said slot to the other side of the pivot of said arm, and means acting as the flexible connection travels in the last-named direction in said slot to withdraw the hooks from the bale.

6. In a device of the character described, the combination of a clevis or head, angular arms pivotally connected to said clevis or head, a lever pivotally connected to the free end portions of said angular arms, bale engaging hooks, a ring or traveler movable longitudinally of said lever as the latter is tilted on its pivotal connection with the angular arms, said angular arms having a shouldered or recessed portion into which the ring or traveler may enter as the lever is tilted in a direction to support the load and from which the ring or traveler is moved as the lever is tilted in the opposite direction to discharge the load.

7. In a device of the character described, a clevis or head, a tilting angular arm pivotally connected thereto, a drop lever pivotally connected to the angular end portion of the angular arm and provided with a longitudinal slot, a pair of bale-engaging hooks disposed at each side of the bale, flexible connections between said hooks and the slot of said drop lever, means for tilting the drop lever in one direction to tighten said connection and carry the part thereof that is engaged with said lever to a position within the tilting angular arm beyond the vertical line passing through said part and the pivotal connection of the drop lever with said hook, and means for tilting the drop lever in the other direction to carry the said part of said connection that is engaged with the lever outside the angular portion of said angular arm to slacken said connection.

8. In a device of the character described, a clevis or head, a tilting angular arm pivotally connected thereto, a drop lever pivotally connected to the free angular end portion of said tilting angular arm and provided with a longitudinal slot, a pair of bale-engaging hooks disposed at each side of the bale, connections between said hooks and the slot of said drop lever, means for tilting the drop lever in one direction to tighten said connections and carry the part thereof that is engaged with said lever to a position within the tilting angular portion of said angular arm beyond the vertical plane passing through said part and the pivotal connection of the drop lever with said angular arm, means for tilting the drop lever in the other direction to carry said part of said connection that is engaged with the lever outside the angular portion of said angular arm to slacken said connection, and means connected with the hooks acting automatically to withdraw the hooks from and drop the bale as the said connections are slackened.

9. In a device of the character described, a clevis or head, a tilting angular arm pivotally connected thereto, a drop lever pivotally connected to the angular end portions of the tilting angular arm and provided with a longitudinal slot, a pair of bale-engaging hooks disposed at each side of the bale, connections between said hooks and the slot of said drop lever, means for tilting the drop lever in one direction to tighten said connection and carry the part thereof that is engaged with said lever to a position within the angular portion of said tilting angular arm beyond the vertical plane passing through said part and the pivotal connection of the drop lever with said hook, means for tilting the drop lever in the other direction to slacken said connection, and means connected to the pointed ends of the hooks to automatically withdraw the hooks in a direction substantially parallel to the length of said pointed ends and drop the bale as said connections are slackened.

10. In a cotton bale carrier, a trolley, a clevis or head connected thereto, angular arms pivotally connected to the clevis or head, a drop lever having a longitudinal guideway and pivoted to the angular end portions of said angular arms at a point below said guideway, bale engaging hooks to embrace a bale and engage therewith, connections between the hooks and the guideway of said lever, means for turning said lever in one direction to cause said connections to move along said guideway into the angular portion of said angular arms above and beyond the fulcrum of said lever, and means acting automatically as the trolley is moved to turn said lever in the opposite direction to carry the connections out of the angular portion of said angular arms and tilt the angular arms to permit the connections to run along the guideway.

In testimony whereof, I have signed my name to this specification, in the presence of two subscribing witnesses.

JOHN R. FORDYCE.

Witnesses:
C. E. AVEY,
P. F. VOIGT.